(12) United States Patent
Kawamoto et al.

(10) Patent No.: US 6,809,782 B1
(45) Date of Patent: Oct. 26, 2004

(54) DIFFUSING POLARIZING MEMBER AND LIQUID CRYSTAL DISPLAY

(75) Inventors: Ikuo Kawamoto, Ibaraki (JP); Hironori Motomura, Ibaraki (JP); Tadayuki Kameyama, Ibaraki (JP); Satoru Kawahara, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 153 days.

(21) Appl. No.: 10/049,310

(22) PCT Filed: Aug. 10, 2000

(86) PCT No.: PCT/JP00/05379

§ 371 (c)(1), (2), (4) Date: Feb. 12, 2002

(87) PCT Pub. No.: WO01/13147

PCT Pub. Date: Feb. 22, 2001

(30) Foreign Application Priority Data

Aug. 18, 1999  (JP) ........................................ P.11-231256

(51) Int. Cl.⁷ ............................................. B02F 1/1335
(52) U.S. Cl. ........................... 349/96; 349/112; 349/98; 359/498; 359/487
(58) Field of Search ........................... 349/96, 98, 112; 359/499, 487, 498

(56) References Cited

U.S. PATENT DOCUMENTS

| | | | |
|---|---|---|---|
| 6,067,136 A | | 5/2000 | Yamaguchi et al. |
| 6,147,733 A | * | 11/2000 | Miyamoto et al. .......... 349/112 |
| 6,300,989 B1 | * | 10/2001 | Iijima .......................... 349/96 |
| 6,384,884 B1 | * | 5/2002 | Nakamura et al. .......... 349/113 |
| 6,421,148 B2 | * | 7/2002 | Steiner ........................ 359/15 |
| 6,580,483 B2 | * | 6/2003 | Suzuki et al. ............... 349/115 |
| 6,611,305 B2 | * | 8/2003 | Kamijo et al. .............. 349/112 |

FOREIGN PATENT DOCUMENTS

| | | |
|---|---|---|
| JP | 4-204402 A | 7/1992 |
| JP | 11-125817 A | 5/1999 |
| JP | 11-160508 A | 6/1999 |
| JP | 11-183712 A | 7/1999 |
| JP | 11-231131 A | 8/1999 |
| JP | 11-237502 A | 9/1999 |
| JP | 11-248910 A | 9/1999 |
| JP | 11-281970 A | 10/1999 |
| JP | 2000-147250 A | 5/2000 |

OTHER PUBLICATIONS

International Search Report.

* cited by examiner

*Primary Examiner*—Kenneth Parker
(74) *Attorney, Agent, or Firm*—Westerman, Hattori Daniels & Adrian LLP

(57) ABSTRACT

A diffusing/polarizing member (1) is provided which comprises a laminate (1) of a reflective polarizer (12) which separates incident natural light into a reflected light comprising a polarized light and a transmitted light, and a diffusing layer (11), wherein the reflective polarizer and the diffusing layer, when viewed from a slantwise direction, have respective colors which are complementary. Also provided is a liquid crystal display having the diffusing/polarizing member. In this diffusing/polarizing member, the color of the reflective polarizer viewed from a slantwise direction is negated by the color of the diffusing layer, these colors being complementary, whereby the member as a whole can be reduced in coloration when viewed from a slantwise direction. Thus, a reflective, semi-transmitting, or another liquid crystal display reduced in display unevenness, e.g., coloration in viewing from a slantwise direction, can be provided.

11 Claims, 1 Drawing Sheet

DIFFUSING POLARIZING MEMBER AND LIQUID CRYSTAL DISPLAY

TECHNICAL FIELD

The present invention relates to a diffusing/polarizing member which can inhibit coloration in viewing from a slantwise direction, can attain bright displays, and is suitable for use in, e.g., fabricating a reflective or semi-transmitting liquid crystal display.

BACKGROUND ART

Reflective or semi-transmitting liquid crystal displays have hitherto been known which employ a reflective polarizer comprising a linearly polarized light separator or circularly polarized light separator which separates incident natural light into a reflected light consisting of a polarized light and a transmitted light. However, these liquid crystal displays have had a problem that when they are viewed from a slantwise direction, white or black pictures assume a color.

The coloration in the case of a linearly polarized light separator is attributable to the scattering caused by a birefringent multilayered film. In the case of a circularly polarized light separator, the coloration is attributable to difficulties in maintaining the parallelism of the axis of polarization and the axis of retardation of a quarter wavelength plate in all directions.

An aim of the invention is to develop a diffusing/polarizing member which enables the fabrication of a reflective, semi-transmitting, or another liquid crystal display reduced in display unevenness, e.g., coloration in viewing from a slantwise direction.

DISCLOSURE OF THE INVENTION

The invention provides a diffusing/polarizing member, characterized in that it comprises a laminate of a reflective polarizer which separates incident natural light into a reflected light comprising a polarized light and a transmitted light, and a diffusing layer, and the reflective polarizer and the diffusing layer, when viewed from a slantwise direction, have respective colors which are complementary. The invention further provides liquid crystal displays, characterized by having the diffusing/polarizing member.

BEST MODE FOR CARRYING OUT THE INVENTION

Figure 1:
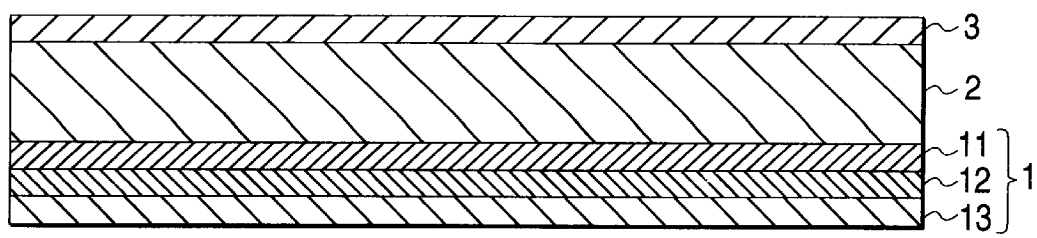
FIG. 1 is a sectional view of an embodiment of the liquid crystal displays.

The diffusing/polarizing member of the invention comprises a laminate of a reflective polarizer which separates incident natural light into a reflected light comprising a polarized light and a transmitted light and a diffusing layer, wherein the reflective polarizer and the diffusing layer, when viewed from a slantwise direction, have respective colors which are complementary.

As the reflective polarizer can be used a suitable one which has such a characteristic property that when natural light is caused to strike thereon, it reflects a linearly polarized light having a given polarization direction or a circularly polarized light having a given direction and transmits the other components of light. Examples thereof include a linearly polarized light separator which characteristically transmits a linearly polarized light having a given polarization direction and reflects the other components of light, such as a multilayered thin film of a dielectric and a laminate composed of thin films differing in refractive index anisotropy, a circularly polarized light separator which characteristically reflects either a left-hand circularly polarized light or a right-hand circularly polarized light and transmits the other components of light, such as a cholesteric liquid crystal layer, in particular, an oriented film of a cholesteric liquid crystal polymer, and a structure comprising such an oriented liquid crystal layer supported on a film substrate, and the like.

The circularly polarized light separator may, for example, be one which has a laminate comprising a combination of two or more superposed cholesteric liquid crystal layers differing in reflected-light wavelength so that it characteristically reflects/transmits a circularly polarized light in a wide wavelength range such as, e.g., the visible light region.

Besides being used for supplying a circularly polarized light, the circularly polarized light separator in the constitution described above may be used in combination with a retardation film for the purpose of converting the circularly polarized light into a linearly polarized light or for another purpose. Although this retardation film may be one showing suitable retardation, a quarter wavelength plate is preferably used from the standpoint of efficiently converting a circularly polarized light into a linearly polarized light.

The quarter wavelength plate may be an appropriate one. However, one which functions as a quarter wavelength plate in a wide wavelength range such as, e.g., the visible light region can be obtained, for example, by a method in which a retardation layer functioning as a quarter wavelength plate with respect to a monochromatic light, e.g., light having a wavelength of 550 nm, is superposed on a retardation layer showing other retardation properties, e.g., a retardation layer functioning as a half wavelength plate. Consequently, the retardation film or the quarter wavelength plate may comprise one or more retardation layers.

In this connection, the retardation films or retardation layers described above can be obtained, for example, as a birefringent film consisting of a stretched film of any of various polymers, an oriented film of a liquid crystal polymer such as a discotic or nematic liquid crystal polymer, a structure comprising such an oriented liquid crystal layer supported on a film substrate, or the like.

Suitable polymers may be used for forming the birefringent film. Examples thereof include olefin polymers such as polyethylene, polypropylene, and polyolefins having a norbornene structure, polyester type polymers, acrylic polymers such as poly(methylmethacrylate), cellulosic polymers, polyamides, polyimides, polysulfones, polyethersulfones, polyetheretherketones, poly(phenylene sulfide), poly(vinyl alcohol), poly(vinyl chloride), poly(vinyl butyrate), polycarbonates, polystyrene, polyarylates, polyoxymethylene, and the like.

The stretched film may be one which has undergone a uniaxial, biaxial, or another treatment in an appropriate manner, and may be a birefringent film or the like whose refractive index in the film thickness direction has been regulated, for example, by applying a shrinking force or/and a stretching force to the film bonded to a heat-shrinkable film.

The diffusing layer can be formed as, e.g., a resin layer containing transparent fine particles. As the transparent fine particles can be used one or more appropriate materials. In general, however, use is made of inorganic fine particles which may be electrically conductive, such as silica, alumina, titania, zirconia, tin oxide, indium oxide, cadmium oxide, or antimony oxide, organic fine particles such as cured or uncured resin particles, or the like.

The diffusing layer comprising a resin layer can be obtained as an appropriate form such as a coating layer formed through coating on the reflective polarizer or retardation film, a resin film containing transparent fine particles, or a diffusing sheet comprising the resin layer supported on a substrate. As the resin containing or holding transparent fine particles can be used appropriate one or more of, for example, the polymers enumerated above with regard to the retardation film described above, thermosetting or ultraviolet-curable resins such as phenolic, melamine, acrylic, urethane, urethane-acrylic, epoxy, and silicone resins, and the like.

The coloration of the diffusing layer in viewing from a slantwise direction can be controlled based on the particle diameter and content (particle density) of the fine transparent particles, difference in refractive index between the resin and the transparent fine particles, etc. The average particle diameter of the transparent fine particles to be used can hence be suitably determined according to the coloration, etc. In general, transparent fine particles having an average particle diameter of 50 $\mu$m or smaller, preferably from 0.1 to 20 $\mu$m, especially from 0.5 to 10 $\mu$m, are used.

The content of transparent fine particles also is suitably determined according to the coloration, etc. In general, however, transparent fine particles are incorporated in an amount of up to 200 parts by weight, preferably from 1 to 100 parts by weight, especially from 5 to 50 parts by weight, per 100 parts by weight of the resin. Although the resin layer generally has a thickness of 500 $\mu$m or smaller, preferably from 1 to 200 $\mu$m, especially from 5 to 100 $\mu$m, the thickness thereof is not limited to these.

In the invention, the reflective polarizer and the diffusing layer are used in such a combination that when they are viewed from a slantwise direction, the respective colors thereof are complementary. Namely, they are used in such a combination that when the reflective polarizer and the diffusing layer are independently viewed from a slantwise direction, the respective colors thereof are complementary. Based on this complementariness, these colors are negated by each other and the diffusing/polarizing member as a whole can be reduced in coloration (made neutral).

With respect to the superposition of the reflective polarizer and the diffusing layer, they may be in a merely stacked state or may have been bonded and fixed to each other with an appropriate adhesive, e.g., a pressure-sensitive adhesive layer. By using the aforementioned coating, a diffusing layer tenaciously adhered to a reflective polarizer or the like can be obtained without necessitating an adhesive.

With respect to the position of the diffusing layer relative to the reflective polarizer, the diffusing layer may be disposed on the viewing side of the reflective polarizer or may be disposed on the side opposite to the viewing side. In the case where a retardation film is used in combination with these, it may be disposed between the reflective polarizer and the diffusing layer, or may be disposed so that the diffusing layer is located between the reflective polarizer and the retardation film.

The diffusing/polarizing member may additionally have a light-absorbing layer. In reflective or semi-transmitting liquid crystal displays fabricated with a reflective polarizer, there are cases where the light which has passed through the reflective polarizer is reflected by, e.g., the surface of an underlying layer and the resultant unnecessary return light lowers the level of black pictures and reduce the contrast. The light-absorbing layer is hence used for the purpose of absorbing the unnecessary return light and thereby preventing the contrast from decreasing. Consequently, the light-absorbing layer is disposed on that side of the diffusing/polarizing member which is opposite to the viewing side.

The light-absorbing layer can be formed according to a technique used hitherto. Examples thereof include a resin layer, resin film, or the like which has one or more appropriate light-absorbing substances, e.g., carbon black and dyes, incorporated therein or held thereon by an appropriate technique, e.g., the dispersion method or coating method.

The light transmittance of the light-absorbing layer can be suitably determined according to the liquid crystal display to be fabricated, etc. In general, in the case where a reflective liquid crystal display is to be fabricated, it is preferred to form a light-absorbing layer having a light transmittance of 1% or lower. In the case where a semi-transmitting liquid crystal display is to be fabricated, it is generally preferred to form a light-absorbing layer having a light transmittance of from 10 to 60%.

The diffusing/polarizing member according to the invention can be used in various applications such as the fabrication of semi-transmitting, reflective, or transmitting liquid crystal displays. In particular, the diffusing/polarizing member is suitable for use in the fabrication of semi-transmitting or reflective liquid crystal displays and in similar applications. In fabricating a liquid crystal display, the diffusing/polarizing member of the invention is usually disposed on that side of a liquid crystal cell which is opposite to the viewing side, e.g., between a liquid crystal cell and an illuminator. However, the diffusing/polarizing member may be disposed on the viewing side of a liquid crystal cell.

Figure 2:
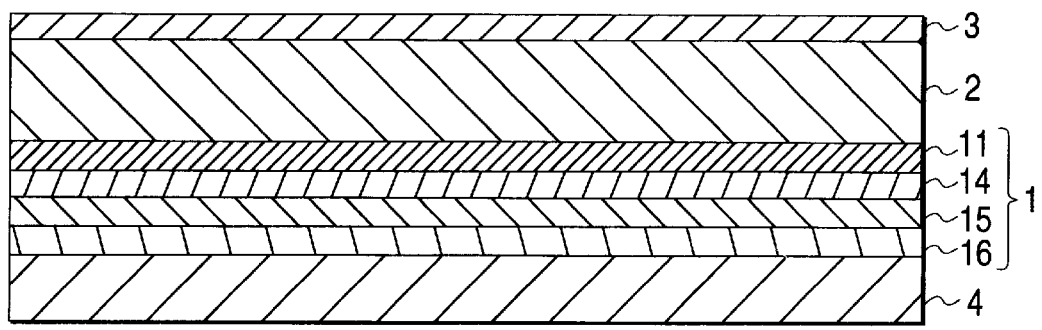
FIG. 2 is a sectional view of another embodiment of the liquid crystal displays.

In FIGS. 1 and 2 are shown examples of the structures of liquid crystal displays fabricated. FIGS. 1 and 2 respectively show a reflective and semi-transmitting liquid crystal display as examples. Numeral 1 denotes a diffusing/polarizing member, 2 a liquid crystal cell, 3 an absorbing polarizer, and 4 an illuminator. The diffusing/polarizing member 1 shown in FIG. 1 is one employing a linearly polarized light separator 12, while the diffusing/polarizing member 1 shown in FIG. 2 is one employing a circularly polarized light separator 15. Incidentally, 11 denotes a diffusing layer, 13 and 16 a light-absorbing layer, and 14 a retardation film (quarter wavelength plate).

A liquid crystal display can be fabricated in a manner used hitherto, except that the diffusing/polarizing member according to the invention is used. Consequently, any desired liquid crystal cell may be employed. For example, liquid crystal cells of appropriate types such as the active matrix operation types, represented by thin film transistor type, or the passive matrix operation types, represented by twisted nematic type and super twisted nematic type, can be used to fabricate various liquid crystal displays.

Besides the absorbing polarizer 3 shown in the Figures, one or more appropriate parts can be disposed in suitable positions according to need in fabricating a liquid crystal display. Examples of such parts include a prism array sheet or lens array sheet for optical path control or another purpose, a retardation film for phase difference compensation, a light diffuser plate, a backlight, and the like.

The absorbing polarizer is used according to need for the purpose of, e.g., controlling the polarization of a linearly polarized light constituting a display light. As this absorbing polarizer can be used an appropriate one which transmits a linearly polarized light having a given polarization direction and absorbs the other components of light. There are no particular limitations on the kind thereof. Examples thereof include polarizing films such as that obtained by adsorbing iodine and/or a dichroic dye onto a hydrophilic polymer film, such as a poly (vinyl alcohol) film, film of poly (vinyl alcohol) which has undergone partial conversion into formal, or film of a partially saponified ethylene/vinyl acetate copolymer, and then stretching the film and that obtained by orienting a polyene such as dehydrated poly (vinyl alcohol) or dehydrochlorinated poly(vinyl chloride), and the like.

Furthermore, the absorbing polarizer may be one obtained by forming a transparent protective layer on one or each side of the polarizing film for the purpose of protection, e.g., water resistance improvement, reinforcement, etc. For forming the transparent protective layer, it is preferred to use a polymer excellent in transparency, mechanical strength, thermal stability, water barrier property, etc.

In this connection, examples of the polymer include cellulosic polymers such as cellulose diacetate and cellulose triacetate, polyester type polymers such as poly(ethylene terephthalate) and poly(ethylene naphthalate), polyethersulfones, polycarbonates, polyamides, polyimides, polyolefins, acrylic resins, thermosetting or ultraviolet-curable resins such as acrylic, urethane, acrylic-urethane, epoxy, and silicone resins, and the like. For forming the transparent protective layer, an appropriate technique can be used, such as coating with a polymer fluid or laminating of a film by bonding.

As stated above, the constituent layers which constitute the diffusing/polarizing member or liquid crystal display according to the invention, such as the reflective polarizer, diffusing layer, retardation film, and absorbing polarizer, may wholly or partly be in a merely stacked state. It is, however, preferred that the constituent layers have been bonded and fixed to each other with an adhesive or the like from the standpoints of preventing axis shifting, preventing foreign substances from coming into spaces between the layers, etc.

As the adhesive can be used an appropriate one such as, e.g., a pressure-sensitive adhesive comprising an appropriate polymer such as an acrylicpolymer, siliconepolymer, polyester, polyurethane, polyether, synthetic rubber, or the like as the base polymer. Especially preferred are pressure-sensitive adhesives, such as acrylic ones, which have excellent optical transparency, show pressure-sensitive adhesive properties including moderate wetting properties, cohesiveness, and adhesiveness, are excellent in weatherability, heat resistance, etc., and do not pose problems such as lifting and peeling under high temperature or high humidity conditions.

In this connection, examples of the acrylic pressure-sensitive adhesives include ones comprising as the base polymer an acrylic polymer having a weight average molecular weight of 100,000 or higher obtained by copolymerizing acrylic monomers comprising an alkyl (meth) acrylate having an alkyl group having up to 20 carbon atoms, e.g., methyl, ethyl, or butyl, and one or more modifying ingredients such as (meth)acrylic acid and hydroxyethyl (meth)acrylate in such a combination as to result in a glass transition temperature of 0° C. or lower, and the like. However, the acrylic pressure-sensitive adhesives are not limited to these.

For forming a pressure-sensitive adhesive layer on the reflective polarizer or another constituent part, an appropriate technique may be used, such as, e.g., a method in which a pressure-sensitive adhesive fluid is applied by a suitable spreading technique such as, e.g., flow casting or coating to directly form a pressure-sensitive adhesive layer or a method in which a pressure-sensitive adhesive layer is formed on a separator in the same manner as described above and is then transferred. In this case, a pressure-sensitive adhesive layer can be formed on one or each side of the reflective polarizer or another constituent part, and the pressure-sensitive adhesive layer formed may be composed of two or more superposed layers differing in composition, kind, etc. In the case where a pressure-sensitive adhesive layer is formed on each side, the pressure-sensitive adhesive layers formed respectively on the front and back sides of the reflective polarizer or another constituent part may differ in composition, kind, etc.

The adhesive layer thickness of the pressure-sensitive adhesive layer or the like can be suitably determined according to adhesive strength, etc. It is generally from 1 to 500 $\mu$m. In the case where the pressure-sensitive adhesive layer is exposed on the outer side of the reflective polarizer or another constituent part, it is preferred to provisionally cover the adhesive surface with a separator or the like to thereby prevent fouling, etc.

EXAMPLES

Example 1

A diffusing sheet was bonded through an acrylic pressure-sensitive adhesive layer to one side of a reflective polarizer (PCF350, manufactured by Nitto Denko Corp.) formed by bonding a quarter wavelength plate through an acrylic pressure-sensitive adhesive layer to one side of a circularly polarized light separator comprising a cholesteric liquid crystal. Thus, a diffusing/polarizing member was obtained. The diffusing sheet was one which consisted of an acrylic resin having a refractive index of 1.48 and incorporated therein melamine resin particles having an average particle diameter of 0.4 $\mu$m and a refractive index of 1.58 (30 parts by weight per 100 parts by weight of the acrylic resin) and which assumed a light blue color when viewed from a slantwise direction. The reflective polarizer assumed a light yellow color when viewed from a slantwise direction.

Example 2

A reflecting sheet which consisted of an acrylic resin having a refractive index of 1.48 and incorporated therein epoxy resin particles having an average particle diameter of 1.1 $\mu$m and a refractive index of 1.53 (30 parts by weight per 100 parts by weight of the acrylic resin) and which assumed a light green color when viewed from a slantwise direction was bonded through an acrylic pressure-sensitive adhesive layer to one side of a reflective polarizer comprising a linearly polarized light separator (DBEF, manufactured by 3M) which assumed a light red color when viewed from a slantwise direction. Thus, a diffusing/polarizing member was obtained.

COMPARATIVE EXAMPLE

A diffusing/polarizing member was obtained in the same manner as in Example 1, except that as a diffusing sheet, use was made of one which consisted of an acrylic resin having a refractive index of 1.48 and incorporated therein silicone resin particles having an average particle diameter of 4 $\mu$m and a refractive index of 1.43 (30 parts by weight per 100 parts by weight of the acrylic resin) and which assumed a light-yellow color when viewed from a slantwise direction.

EVALUATION TEST

The diffusing/polarizing members obtained in the Examples and Comparative Example were viewed from a slantwise direction and examined for coloration. The results obtained are shown in the following table.

|  | Reflective Polarizer | Diffusing sheet | Diffusing/ polarizing member | Evaluation |
|---|---|---|---|---|
| Example 1 | Light yellow | Light blue | Colorless | Good |
| Example 2 | Light red | Light green | Colorless | Good |
| Comparative Example | Light yellow | Light yellow | Yellow | Poor |

Industrial Applicability

In the diffusing/polarizing member of the invention, the color of the reflective polarizer viewed from a slantwise direction can be negated by the color of the diffusing layer, these colors being complementary, whereby the member as a whole can be reduced in coloration when viewed from a slantwise direction. Thus, a liquid crystal display reduced in display unevenness, e.g., coloration in viewing from a slantwise direction, can be provided.

What is claimed is:

1. A diffusing/polarizing member, comprising a laminate of
   a reflective polarizer which separates incident natural light into (i) a reflected light comprising a polarized light and (ii) a transmitted light, and
   a diffusing layer,
   wherein the reflective polarizer and the diffusing layer, when viewed from a slantwise direction, have respective colors which are complementary.

2. The diffusing/polarizing member of claim 1, wherein the reflective polarizer comprises a linearly polarized light separator, a circularly polarized light separator, or a combination of a circularly polarized light separator and a retardation film.

3. The diffusing/polarizing member of claim 2, wherein the retardation film is a quarter wavelength plate.

4. The diffusing/polarizing member of any one of claims 1 to 3, which further has a light-absorbing layer.

5. The diffusing/polarizing member of claim 4, wherein the light-absorbing layer has a light transmittance of 1% or lower.

6. The diffusing/polarizing member of claim 4, wherein the light-absorbing layer has a light transmittance of from 10 to 60%.

7. A liquid crystal display, comprising the diffusing/polarizing member of any one of claims 1 to 3.

8. A liquid crystal display, comprising the diffusing/polarizing member of claim 4.

9. A reflective liquid crystal display, comprising the diffusing/polarizing member of claim 5.

10. A semi-transmitting liquid crystal display, comprising the diffusing/polarizing member of claim 6.

11. The liquid crystal display of claim 8, wherein the light absorbing layer is disposed on a side of the diffusing member which is opposite to the viewing side.

* * * * *